US012075451B2

(12) United States Patent
Shen

(10) Patent No.: US 12,075,451 B2
(45) Date of Patent: Aug. 27, 2024

(54) METHOD OF RECEIVING A PHYSICAL DOWNLINK CONTROL CHANNEL (PDCCH) IN A SEARCH SPACE ASSOCIATED WITH A CONTROL RESOURCE SENT (CORESET)

(71) Applicant: VIVO MOBILE COMMUNICATION CO., LTD., Guangdong (CN)

(72) Inventor: Xiaodong Shen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 599 days.

(21) Appl. No.: 17/215,786

(22) Filed: Mar. 29, 2021

(65) Prior Publication Data

US 2021/0219301 A1 Jul. 15, 2021

Related U.S. Application Data

(63) Continuation of application No. PCT/CN2019/104194, filed on Sep. 3, 2019.

(30) Foreign Application Priority Data

Sep. 30, 2018 (CN) .......................... 201811163023.9

(51) Int. Cl.
*H04W 72/04* (2023.01)
*H04W 24/08* (2009.01)
(Continued)

(52) U.S. Cl.
CPC ........... *H04W 72/53* (2023.01); *H04W 24/08* (2013.01); *H04W 72/0453* (2013.01); *H04W 72/23* (2023.01)

(58) Field of Classification Search
CPC ....... H04W 8/18; H04W 60/00; H04W 24/04; H04W 8/065; H04W 24/08; H04W 4/02;
(Continued)

(56) References Cited

U.S. PATENT DOCUMENTS 11,240,738 B2 * 2/2022 Horiuchi et al. ..... H04W 48/12
2012/0250641 A1 * 10/2012 Sartori et al. ................ 370/329
(Continued)

FOREIGN PATENT DOCUMENTS

| CA | 3064313 A1 * | 10/2019 | ............ H04W 24/10 |
| CN | 106900006 A | 6/2017 | |

(Continued)

OTHER PUBLICATIONS

Wang, et al.: he present application relates to the field of communications, and in particular to a communication method and a communication device for transmitting or receiving control information in the field of wireless communication. (see technical field) (Year: 2018).*

(Continued)

*Primary Examiner* — Meless N Zewdu
(74) *Attorney, Agent, or Firm* — Price Heneveld, LLP

(57) ABSTRACT

A receiving method, a sending method, a terminal, and a network side device are provided. In the sending method, when sending to the terminal the physical downlink control channel PDCCH in the search space associated with the CORESET, the network side device performs frequency-domain offset processing on the CORESET and search spaces corresponding to different times or search spaces in the CORESET at a same time in a plurality of manners, to improve timeliness of PDCCH sending.

9 Claims, 9 Drawing Sheets

(51) Int. Cl.
*H04W 72/0453* (2023.01)
*H04W 72/23* (2023.01)
*H04W 72/53* (2023.01)

(58) Field of Classification Search
CPC ..... H04W 24/02; H04W 24/10; H04W 76/11; H04W 4/50; H04W 4/60; H04W 72/04; H04W 5/00; H04W 48/12; H04W 72/1273; H04W 74/006; H04W 72/0446; H04W 72/0453; H04W 72/046; H04W 4/06; H04W 72/23; H04W 72/20; H04W 72/232; H04W 72/231; H04W 74/002; H04L 41/14; H04L 5/0053; H04L 27/00
See application file for complete search history.

(56) References Cited

U.S. PATENT DOCUMENTS

| | | | |
|---|---|---|---|
| 2013/0182664 A1* | 7/2013 | Chen et al. | H04W 72/042 |
| 2013/0301542 A1* | 11/2013 | Krishnamurthy et al. | 370/329 |
| 2014/0016596 A1* | 1/2014 | Kim et al. | H04W 72/042 |
| 2014/0301346 A1* | 10/2014 | Seo et al. | H04W 72/042 |
| 2014/0328302 A1* | 11/2014 | Park et al. | H04W 72/042 |
| 2015/0237624 A1 | 8/2015 | Tang | |
| 2017/0366377 A1* | 12/2017 | Papasakellariou | H04L 27/261 |
| 2018/0132243 A1* | 5/2018 | Yang et al. | H04W 72/0453 |
| 2018/0279135 A1 | 9/2018 | Hwang et al. | |
| 2018/0337757 A1* | 11/2018 | Noh et al. | H04L 5/0048 |
| 2019/0052432 A1* | 2/2019 | Islam et al. | H04L 5/0053 |
| 2020/0015235 A1 | 1/2020 | Takeda et al. | |
| 2021/0084623 A1 | 3/2021 | Zhang et al. | |
| 2021/0227514 A1* | 7/2021 | Takeda et al. | H04W 72/042 |

FOREIGN PATENT DOCUMENTS

| | | |
|---|---|---|
| CN | 108199819 A | 6/2018 |
| CN | 108574989 A | 9/2018 |
| RU | 2605036 C1 | 12/2016 |
| WO | 2012/151065 A2 | 11/2012 |
| WO | 2018/126431 A1 | 7/2018 |
| WO | 2018143397 A1 | 8/2018 |
| WO | 2018144980 A1 | 8/2018 |
| WO | 2018175420 A1 | 9/2018 |

OTHER PUBLICATIONS (WO 2012152141 A1) >>> Method for Detecting Downlink Control Channel, User Equipment, and Base Station (see title). (Year: 2012).*
(WO 2018199585 A1) >>> Method for Transmitting or Receiving Signal in Wireless Communication System and Apparatus Therefor (see title). (Year: 2018).*
Written Opinion and International Search Report in Application No. PCT/CN2019/104194 dated Apr. 8, 2021.
JP Office Action in Application No. 2021-517783 Dated May 30, 2022.
"Discussion on the channel access procedures" 3GPP TSG RAN WG1 Meeting #94, vivo, R1-1808237, Aug. 20, 2018.
Indian Office Action from Corresponding IN Application No. 202127017727, Feb. 14, 2022.
EP Search Report in Application No. 19865255.4 dated Oct. 29, 2021.
RU Office Action in Application No. 2021111611/07 (024816) dated Nov. 12, 2021.
ETRI., "On REG interleaving for distributed NR-PDCCH," 3GPP TSG RAN WG1 #89, R1-1708098, pp. 1-5, (May 15-19, 2017).
KR Office Action dated Mar. 6, 2023 as received in Application No. 10-2021-7012844.

\* cited by examiner

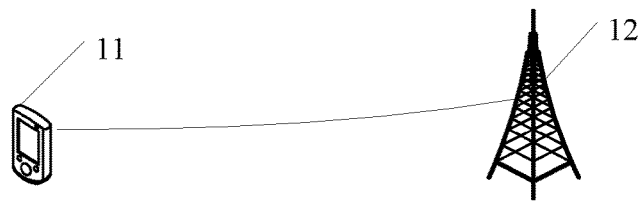

FIG. 1

Send a physical downlink control channel in a search space associated with a CORESET, where the CORESET corresponding to different times occupies different locations in frequency domain; or search spaces in the CORESET corresponding to different times occupy different locations in frequency domain; or at least two search spaces in the CORESET occupy different locations in frequency domain ⟶ 201

FIG. 2

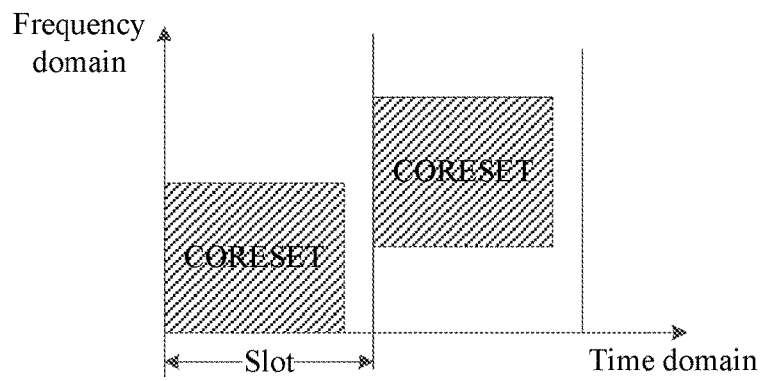

FIG. 3

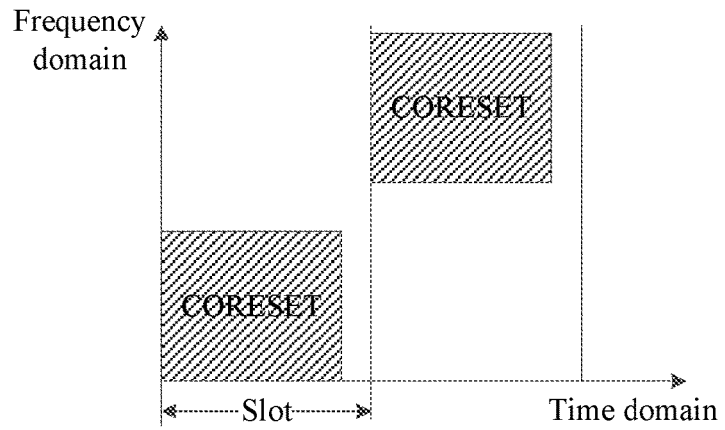

FIG. 4

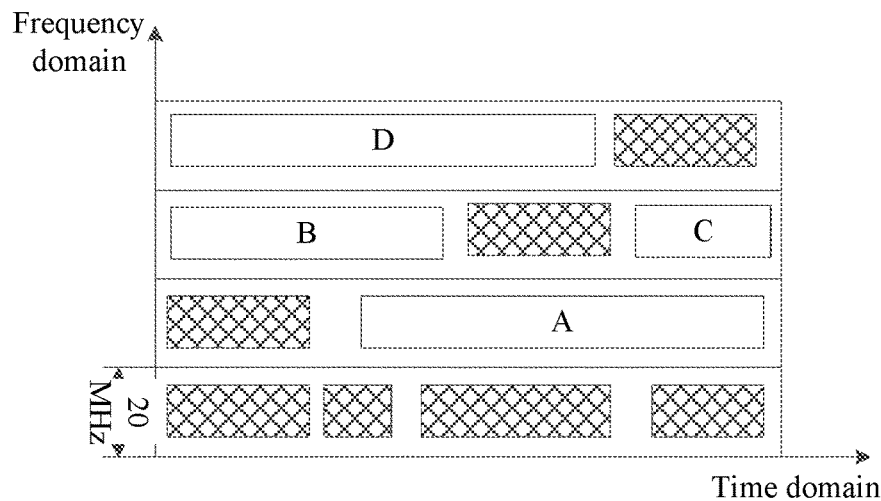

FIG. 16

| Send a physical downlink control channel PDCCH in a search space associated with a CORESET, where the CORESET corresponding to different times occupies different locations in frequency domain; or search spaces in the CORESET corresponding to different times occupy different locations in frequency domain; or at least two search spaces in the CORESET occupy different locations in frequency domain | 1701 |

FIG. 17

| Send a physical downlink control channel PDCCH in a search space associated with a CORESET, where a bundle size of a resource element group REG of the CORESET is greater than 6 | 1801 |

FIG. 18

| Receive a physical downlink control channel PDCCH in a search space associated with a CORESET, where a bundle size of a resource element group REG of the CORESET is greater than 6 | 1901 |

FIG. 19

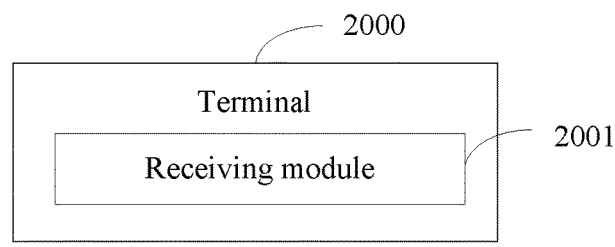

FIG. 20

METHOD OF RECEIVING A PHYSICAL DOWNLINK CONTROL CHANNEL (PDCCH) IN A SEARCH SPACE ASSOCIATED WITH A CONTROL RESOURCE SENT (CORESET)

CROSS-REFERENCE TO RELATED APPLICATIONS

This application is a continuation of PCT Application No. PCT/CN2019/104194 filed on Sep. 3, 2019, which claims priority to Chinese Patent Application No. 201811163023.9, filed on Sep. 30, 2018 in China, which is incorporated herein by reference in its entirety.

TECHNICAL FIELD

The present disclosure relates to transmission of a control channel, and in particular, to a receiving method, a sending method, a terminal, and a network side device.

BACKGROUND

A new radio (NR) communications system supports access on an unlicensed spectrum. A basic concept of the unlicensed spectrum is that when a sending party needs to perform a sending operation, it is required to monitor whether a transmission resource is occupied by another user. If the transmission resource is occupied by the another user, the sending party needs to wait until an available transmission resource is discovered. The unlicensed spectrum can be effectively used in a listen-before-talk (LBT) manner.

A control resource set (CORESET) is a newly introduced time-frequency resource set in the NR communications system. The system needs to send and detect a physical downlink control channel (PDCCH) in a corresponding CORESET.

However, in the related art, frequency domain locations of the CORESET at different times are always fixed. In some cases, the PDCCH cannot be sent in a timely manner, and the terminal cannot receive the PDCCH in a timely manner.

SUMMARY

Embodiments of the present disclosure aim to provide a receiving method, a sending method, a terminal, and a network side device, to resolve a problem in the related art that a PDCCH cannot be sent in a timely manner because a frequency domain location of a CORESET is fixed.

According to a first aspect, an embodiment of the present disclosure provides a receiving method, applied to a terminal and including:

receiving a physical downlink control channel PDCCH in a search space associated with a control resource set CORESET, where the CORESET corresponding to different times occupies different locations in frequency domain; or search spaces in the CORESET corresponding to different times occupy different locations in frequency domain; or at least two search spaces in the CORESET occupy different locations in frequency domain.

According to a second aspect, an embodiment of the present disclosure provides a sending method, applied to a network side device and including: sending a physical downlink control channel PDCCH in a search space associated with a control resource set CORESET, where the CORESET corresponding to different times occupies different locations in frequency domain; or search spaces in the CORESET corresponding to different times occupy different locations in frequency domain; or at least two search spaces in the CORESET occupy different locations in frequency domain.

According to a third aspect, an embodiment of the present disclosure provides a sending method, including:

sending a physical downlink control channel PDCCH in a search space associated with a control resource set CORESET, where a bundle size of a resource element group REG of the CORESET is greater than 6.

According to a fourth aspect, an embodiment of the present disclosure provides a receiving method, including:

receiving a physical downlink control channel PDCCH in a search space associated with a control resource set CORESET, where a bundle size of a resource element group REG of the CORESET is greater than 6.

According to a fifth aspect, an embodiment of the present disclosure further provides a terminal, including:

a receiving module, configured to receive a physical downlink control channel PDCCH in a search space associated with a CORESET, where the CORESET corresponding to different times occupies different locations in frequency domain; or search spaces in the CORESET corresponding to different times occupy different locations in frequency domain; or at least two search spaces in the CORESET occupy different locations in frequency domain.

According to a sixth aspect, an embodiment of the present disclosure further provides a network side device, including:

a sending module, configured to send a physical downlink control channel PDCCH in a search space associated with a CORESET, where the CORESET corresponding to different times occupies different locations in frequency domain; or search spaces in the CORESET corresponding to different times occupy different locations in frequency domain; or at least two search spaces in the CORESET occupy different locations in frequency domain.

According to a seventh aspect, an embodiment of the present disclosure further provides a network side device, including:

a sending module, configured to send a physical downlink control channel PDCCH in a search space associated with a CORESET, where a bundle size of a resource element group REG of the CORESET is greater than 6.

According to an eighth aspect, an embodiment of the present disclosure further provides a terminal, including:

a receiving module, configured to receive a physical downlink control channel PDCCH in a search space associated with a CORESET, where a bundle size of a resource element group REG of the CORESET is greater than 6.

According to a ninth aspect, an embodiment of the present disclosure further provides a terminal. The terminal includes a processor, a memory, and a computer program that is stored in the memory and that can run on the processor, and when executing the computer program, the processor implements the steps in the receiving method described above.

According to a tenth aspect, an embodiment of the present disclosure further provides a network side device. The network side device includes a processor, a memory, and a computer program that is stored in the memory and that can run on the processor, and when executing the computer program, the processor implements the steps in the sending method described above.

According to an eleventh aspect, an embodiment of the present disclosure further provides a computer-readable storage medium. The computer-readable storage medium stores a computer program, and when executing the computer program, a processor implements the steps in the sending method or the receiving method described above.

In a specific embodiment of the present disclosure, when sending the physical downlink control channel PDCCH in the search space associated with the CORESET, the network side device performs frequency-domain offset processing on the CORESET and search spaces corresponding to different times or search spaces in the CORESET at a same time in a plurality of manners, to improve timeliness of PDCCH sending.

BRIEF DESCRIPTION OF DRAWINGS

FIG. 1 is a structural diagram of a network system applicable to an embodiment of the present disclosure;

FIG. 2 is a schematic flowchart of a sending method according to an embodiment of the present disclosure;

FIG. 3 is a schematic diagram in which a CORESET corresponding to different times occupies different locations in frequency domain in a specific embodiment of the present disclosure;

FIG. 4 is another schematic diagram in which a CORESET corresponding to different times occupies different locations in frequency domain in a specific embodiment of the present disclosure;

FIG. 16 is a schematic diagram of a mapping location of a CORESET/search space when a PDCCH cannot be transmitted on a frequency band in a specific embodiment of the present disclosure;

FIG. 17 is a schematic flowchart of a receiving method according to an embodiment of the present disclosure;

FIG. 18 is a schematic flowchart of another sending method according to an embodiment of the present disclosure;

FIG. 19 is a schematic flowchart of another receiving method according to an embodiment of the present disclosure;

FIG. 20 is a first structural diagram of a terminal according to an embodiment of the present disclosure;

DESCRIPTION OF EMBODIMENTS

Figure 5:
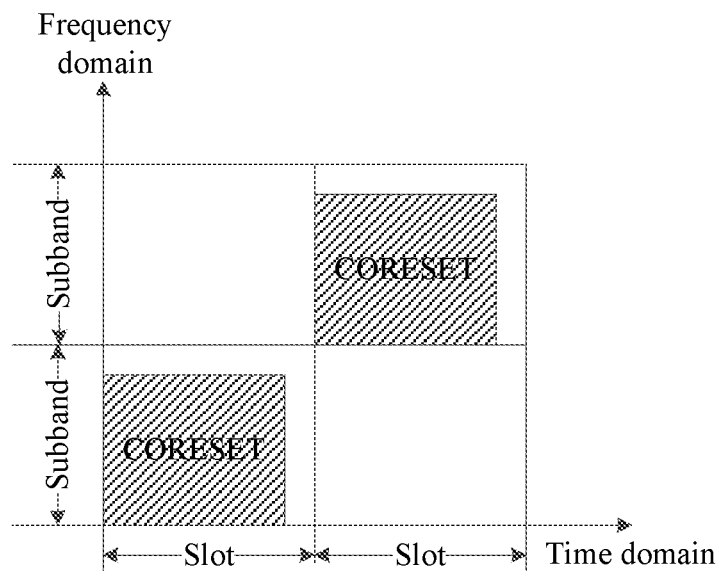
FIG. 5 is still another schematic diagram in which a CORESET corresponding to different times occupies different locations in frequency domain in a specific embodiment of the present disclosure.

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Terms "first" and "second" in this application are used to distinguish between similar objects, and do not need to be used to describe a specific order or sequence. In addition, terms "include", "have", and any modification thereof are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" used in this application means at least one of the connected objects. For example, A and/or B and/or C represents the following seven cases: Only A exists, only B exists, only C exists, both A and B exist, both B and C exist, both A and C exist, or A, B, and C all exist.

Referring to FIG. 1, FIG. 1 is a structural diagram of a network system applicable to an embodiment of the present disclosure. As shown in FIG. 1, the network system includes a terminal 11 and a network side device 12. Communication may be performed between the terminal 11 and the network side device 12.

In this embodiment of the present disclosure, the terminal 11 may also be referred to as UE (user equipment). In specific implementation, the terminal 11 may be a terminal side device such as a mobile phone, a tablet personal computer, a laptop computer, a personal digital assistant (PDA), a mobile internet device (MID), a wearable device, or an in-vehicle device. It should be noted that a specific type of the terminal 11 is not limited in this embodiment of the present disclosure.

The network side device 12 may be a base station, a relay, an access point, or the like. The base station may be a base station (for example, a 5G NR NB) of 5G and a later version, or a base station in another communications system (for example, an evolved NodeB (eNB)). It should be noted that a specific type of the network side device 12 is not limited in this embodiment of the present disclosure.

According to a receiving method, a sending method, a terminal, and a network side device in embodiments of the present disclosure, when sending a PDCCH, the network side device performs offset processing on a CORESET corresponding to different times in frequency domain, so that the CORESET corresponding to different times occupies different locations in frequency domain; or performs offset processing on a same search space in a CORESET corresponding to different times in frequency domain, so that search spaces corresponding to the CORESET corresponding to different times occupy different locations in frequency domain; or performs offset processing on at least two search spaces of a CORESET at a specified time in frequency domain, so that the CORESET and/or the search space are no longer fixed in frequency domain, but are distributed in different frequency bands, to improve timeliness of PDCCH sending and receiving.

As shown in FIG. 2, a sending method in a specific embodiment of the present disclosure is applied to a network side device, including:

Step 201: Send a physical downlink control channel PDCCH in a search space associated with a CORESET.

The CORESET corresponding to different times occupies different locations in frequency domain; or search spaces in the CORESET corresponding to different times occupy different locations in frequency domain; or at least two search spaces in the CORESET occupy different locations in frequency domain.

In a specific embodiment of the present disclosure, when sending the physical downlink control channel PDCCH in the search space associated with the CORESET, the network side device performs frequency-domain offset processing on the CORESET and search spaces corresponding to different times or search spaces in the CORESET at a same time in a plurality of manners, to improve timeliness of PDCCH sending.

It should be noted herein that, in a specific embodiment of the present disclosure, the CORESET corresponding to different times occupies different locations in frequency domain, but each CORESET has a same ID. For the terminal, IDs belongs to a same CORESET, and a difference only lies in that a relationship between CORESETs having a same ID in frequency domain is determined based on a parameter delivered by the network side or predefined by a protocol.

Similarly, for a search space included in the CORESET, the CORESET corresponding to different times includes a same quantity of search spaces, and each search space in the CORESET corresponding to different times has a same ID. For the terminal, IDs belong to a same search space.

That is, in a specific embodiment of the present disclosure, a quantity of CORESETs does not need to be extended, but a transmission resource mapping scheme of the CORESET and/or the search space is used to improve timeliness of PDCCH sending.

In a specific embodiment of the present disclosure, that the CORESET corresponding to different times occupies different locations in frequency domain include a plurality of cases. For example:

The CORESET corresponding to different times has different start locations in frequency domain, but there is a certain overlap in frequency domain, as shown in FIG. 3.

The CORESET corresponding to different times has different start locations in frequency domain, and the CORESET corresponding to different times does not overlap in frequency domain, as shown in FIG. 4.

Certainly, the CORESET corresponding to different times may occupy different locations in frequency domain by using different bandwidths in frequency domain.

For a terminal that supports an unlicensed frequency band, the terminal can effectively use an unlicensed spectrum in a listen-before-talk (Listen-before-talk, carrier sense) manner. Generally, channel busy/idle detection is performed based on a specific subband bandwidth (for example, 20 MHZ), and a transmit end may determine whether to perform sending based on a busy and idle status of a subband.

When the method in this specific embodiment of the present disclosure is combined with a transmission technology in an unlicensed frequency band, for better detection by the terminal, as shown in FIG. 5, if the CORESET corresponding to different times has different start locations in frequency domain, frequency domain resources occupied by the CORESET corresponding to different times are distributed in different channel monitoring subbands.

Figure 6:
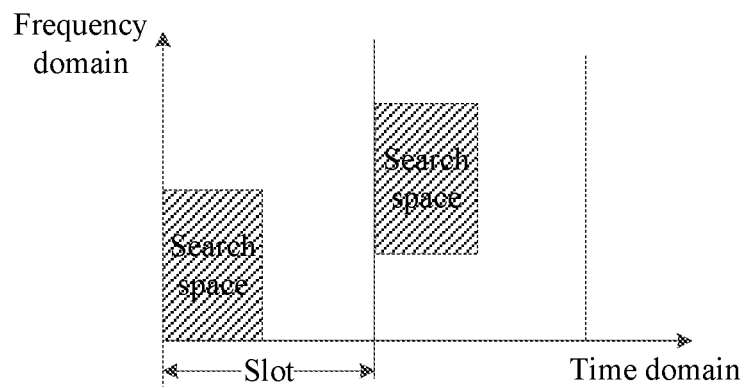
FIG. 6 is a schematic diagram in which search spaces of a CORESET corresponding to different times occupy different locations in frequency domain in a specific embodiment of the present disclosure.

In another manner, search spaces in the CORESET corresponding to different times occupy different locations in frequency domain. There are different manners for different occupation locations. For example:

At least two search spaces corresponding to different times have different start locations in frequency domain, but there is a certain overlap in frequency domain, as shown in FIG. 6.

Figure 7:
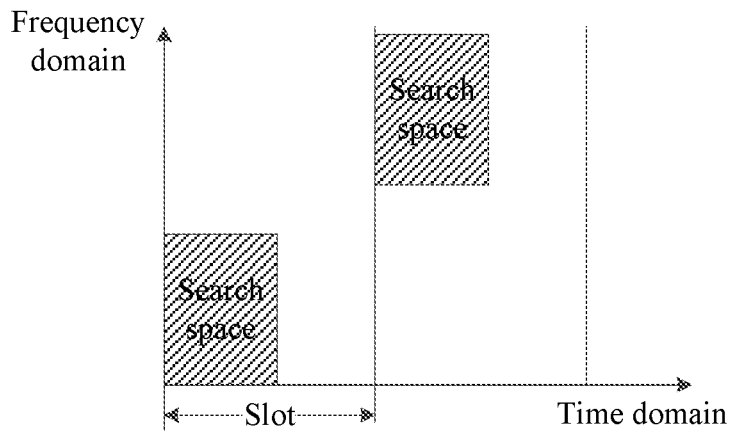
FIG. 7 is another schematic diagram in which search spaces of a CORESET corresponding to different times occupy different locations in frequency domain in a specific embodiment of the present disclosure.

At least two search spaces corresponding to different times have different start locations in frequency domain, and the at least two search spaces corresponding to different times do not overlap in frequency domain, as shown in FIG. 7.

Certainly, different occupation locations may also be implemented by using different bandwidths in frequency domain.

Figure 8:
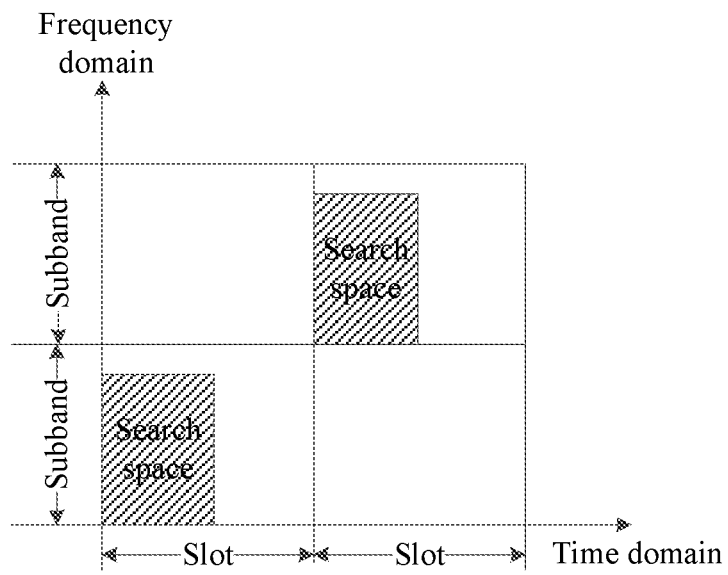
FIG. 8 is still another schematic diagram in which search spaces of a CORESET corresponding to different times occupy different locations in frequency domain in a specific embodiment of the present disclosure.

When the method in this specific embodiment of the present disclosure is combined with a transmission technology of an unlicensed frequency band, for better detection by the terminal, as shown in FIG. 8, frequency domain resources occupied by the at least two search spaces corresponding to different times are distributed in different channel monitoring subbands (for example, 20 M)

In still another manner, the at least two search spaces in the CORESET occupy different locations in frequency domain. A difference between this manner and the foregoing two manners lies in that this manner focuses on an occupation location of the search space in the CORESET in frequency domain.

Figure 9:
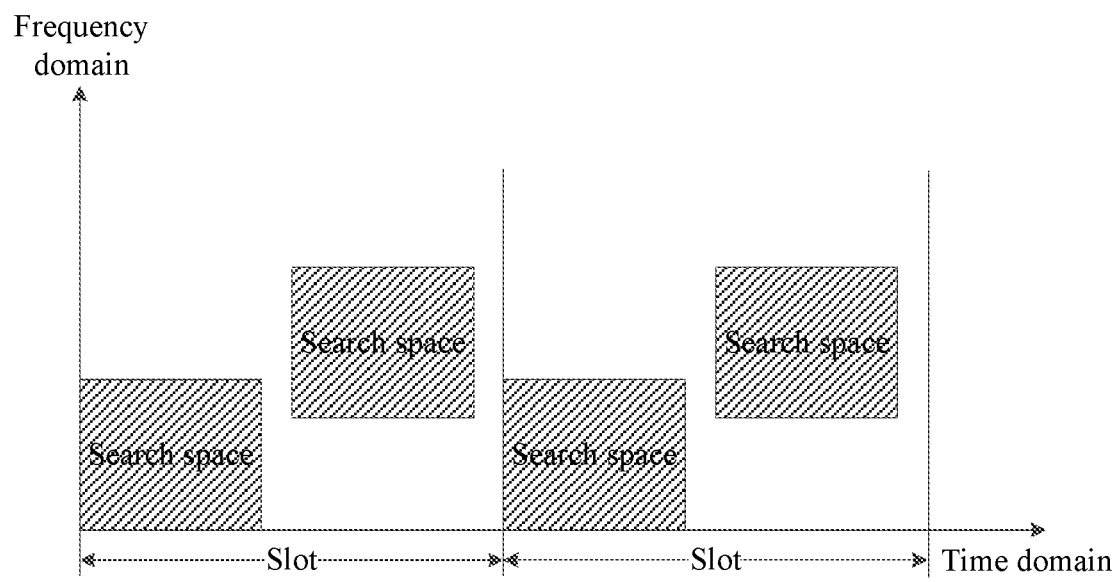
FIG. 9 is a schematic diagram in which at least two search spaces of a CORESET occupy different locations in frequency domain in a specific embodiment of the present disclosure.

There are different manners for different occupation locations. For example:

A plurality of search spaces in the CORESET have different start locations in frequency domain, but there is a certain overlap in frequency domain, as shown in FIG. 9.

Figure 10:
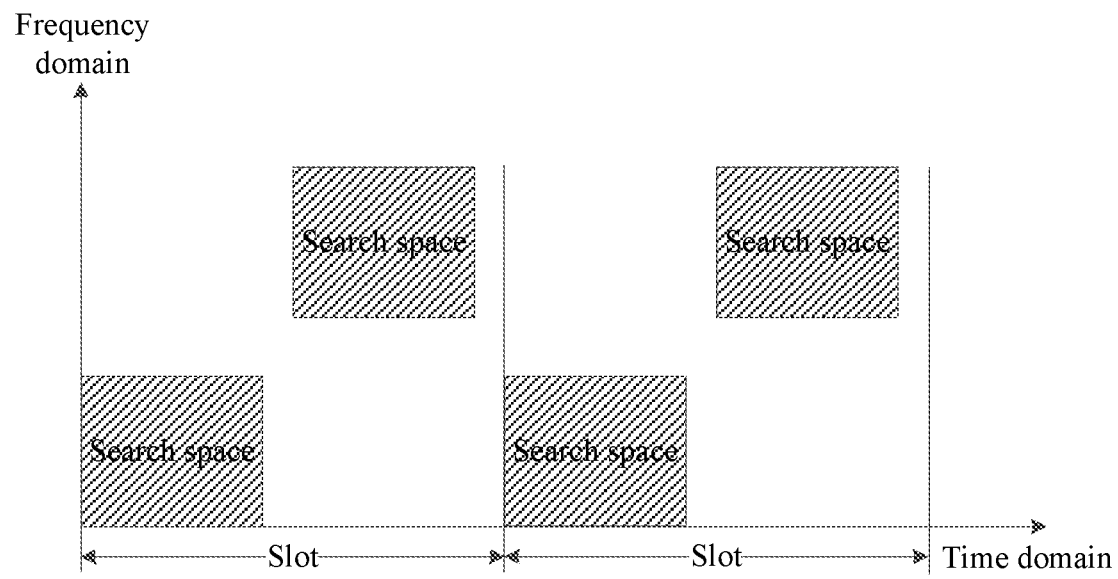
FIG. 10 is another schematic diagram in which at least two search spaces of a CORESET occupy different locations in frequency domain in a specific embodiment of the present disclosure

A plurality of search spaces in the CORESET have different start locations in frequency domain, and the CORE- SET corresponding to different times does not overlap in frequency domain, as shown in FIG. 10.

Certainly, different occupation locations may also be implemented by using different bandwidths in frequency domain.

Figure 11:
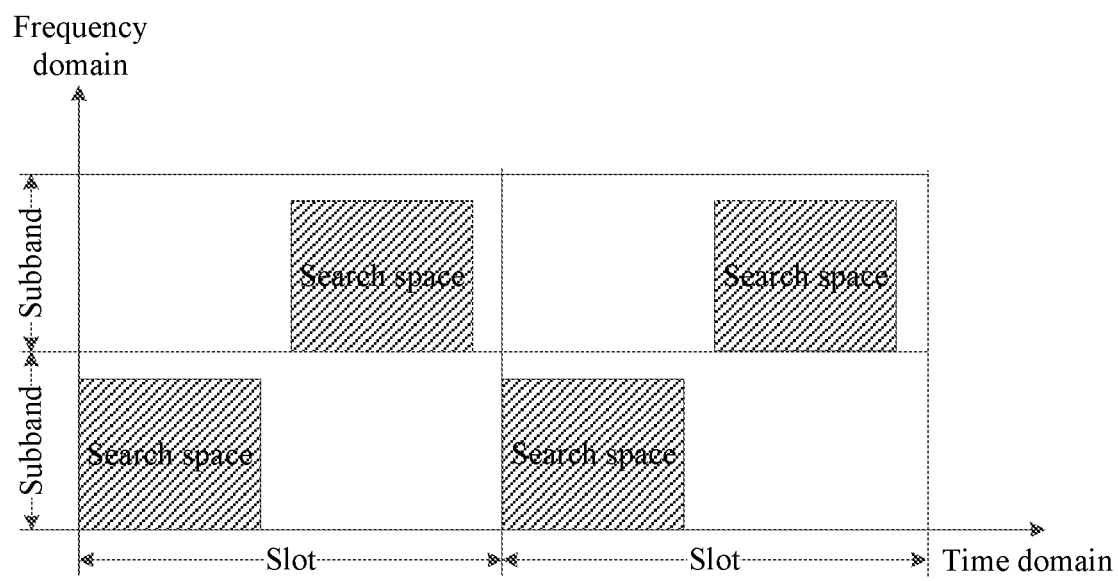
FIG. 11 is still another schematic diagram in which at least two search spaces of a CORESET occupy different locations in frequency domain in a specific embodiment of the present disclosure.

When the method in this specific embodiment of the present disclosure is combined with a transmission technology of an unlicensed frequency band, for better detection by the terminal, as shown in FIG. 11, frequency domain resources occupied by two search spaces corresponding to different times are distributed in different channel monitoring subbands.

In a specific embodiment of the present disclosure, the CORESET may include only one search space, or may include two or more search spaces.

To ensure that in the CORESET corresponding to different times, in a specific embodiment of the present disclosure, a CORESET and/or a search space may be determined in frequency domain based on a time index number or an index number of the CORESET or an index number of the search space, so that the CORESET corresponding to different times occupies different locations in frequency domain, or search spaces in the CORESET corresponding to different times occupy different locations in frequency domain.

In a specific embodiment of the present disclosure, the following formula may be used to determine a frequency location $L_i$ of the $i^{th}$ search space (i=1, 2, ... N, where N is a quantity of search spaces in the CORESET): wherein, $$L_i = T_i * \mathrm{mod}(S_i, P) + \mathrm{offset}_i$$

$T_i$ is a frequency domain offset amplitude of the $i^{th}$ search space, $S_i$ is a time index number, an index number of the CORESET, or an index number of the search space, the time index number may be a slot, a subframe, or an index number of a symbol, P is a frequency offset period, $\mathrm{offset}_i$ is an initial frequency domain offset of the $i^{th}$ search space, and Mod is a mod operation.

In a specific embodiment of the present invention, if the CORESET includes at least two search spaces, there may be the following four cases according to the foregoing formula:

Case 1: The at least two search spaces correspond to the same $T_i$ and correspond to the same $\mathrm{offset}_i$.

Figure 12:
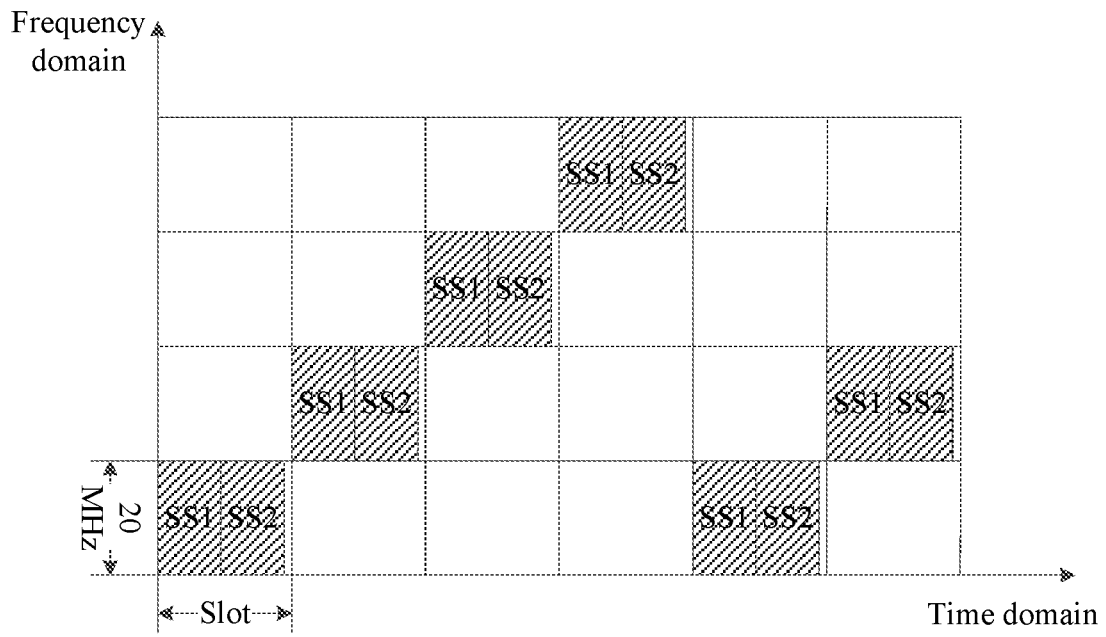
FIG. 12 is a schematic diagram in which at least two search spaces of a CORESET occupy different locations in frequency domain when both $T_i$ and $offset_i$ are the same in a specific embodiment of the present disclosure.

In this case, for example, the CORESET includes two search spaces. It is assumed that $T_1=T_2=0$ and $\mathrm{offset}_1=\mathrm{offset}_2=20$ MHz. As shown in FIG. 12, search spaces in the CORESET corresponding to different times occupy different locations in frequency domain.

In this case, an offset of the CORESET is the same as an offset of a search space.

Case 2: The at least two search spaces correspond to the same $T_i$ but correspond to different $\mathrm{offset}_i$.

Figure 13:
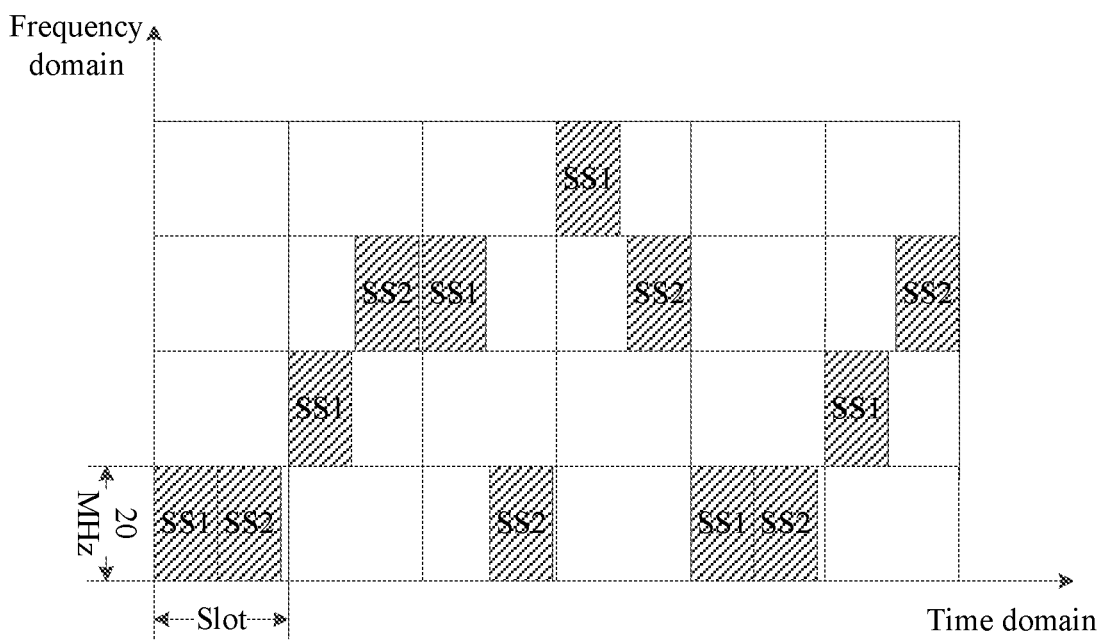
FIG. 13 is a schematic diagram in which at least two search spaces of a CORESET occupy different locations in frequency domain when $T_i$ is different and $offset_i$ is the same in a specific embodiment of the present disclosure.

In this case, for example, the CORESET includes two search spaces. It is assumed that $T_1=T_2=0$, $\mathrm{offset}_1=20$ MHz, and $\mathrm{offset}_2=40$ MHz. As shown in FIG. 13, search spaces in the CORESET corresponding to different times occupy different locations in frequency domain. It may be found that in this case, a frequency domain location of a search space no longer synchronously changes.

Case 3: The at least two search spaces correspond to different $T_i$ but correspond to the same $\mathrm{offset}_i$.

Figure 14:
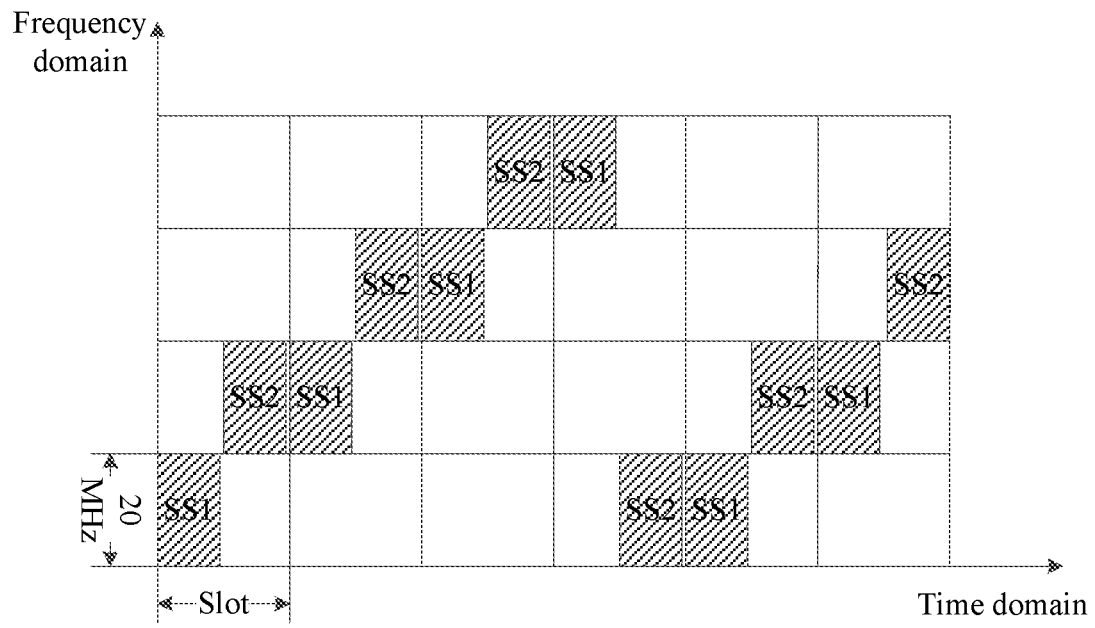
FIG. 14 is a schematic diagram in which at least two search spaces of a CORESET occupy different locations in frequency domain when $T_i$ is the same and $offset_i$ is different in a specific embodiment of the present disclosure.

In this case, for example, the CORESET includes two search spaces. It is assumed that $T_1=0$, $T_2=20$ MHz, and $\mathrm{offset}_1=\mathrm{offset}_2=20$ MHz. As shown in FIG. 14, search spaces in the CORESET corresponding to different times occupy different locations in frequency domain. It may be found that in this case, a frequency domain location of a search space synchronously changes.

Case 4: The at least two search spaces correspond to different $T_i$ and different $\mathrm{offset}_i$.

Figure 15:
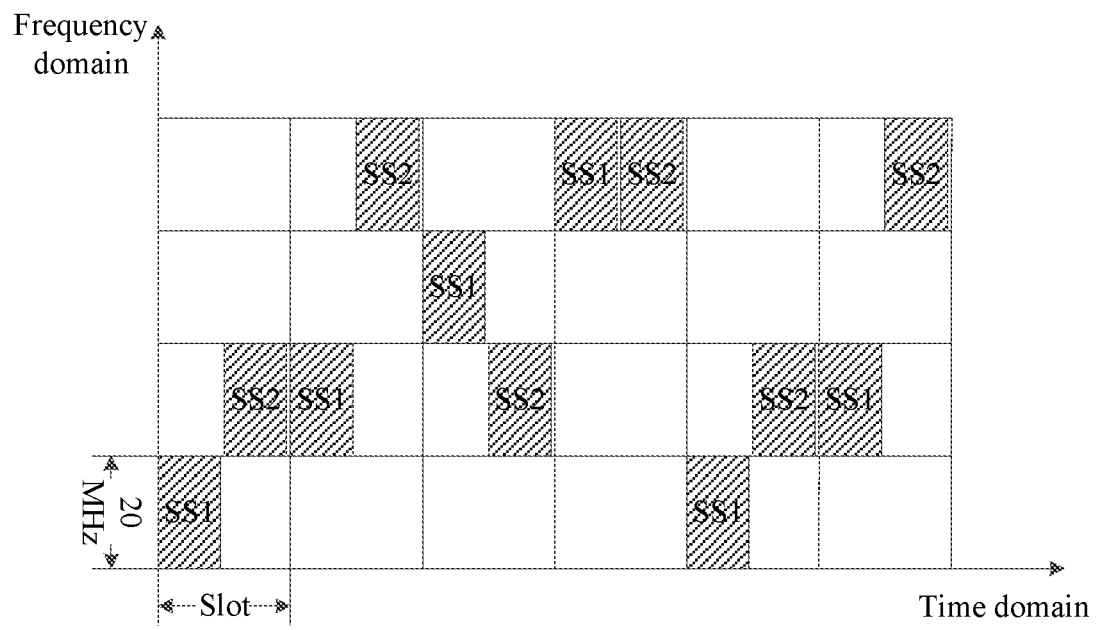
FIG. 15 is a schematic diagram in which at least two search spaces of a CORESET occupy different locations in frequency domain when both $T_i$ and $offset_i$ are different in a specific embodiment of the present disclosure.

In this case, for example, the CORESET includes two search spaces. It is assumed that $T_1=0$, $T_2=20$ MHz, $\mathrm{offset}_1=20$ MHz, and $\mathrm{offset}_2=40$ MHz. As shown in FIG. 15, search spaces in the CORESET corresponding to different times occupy different locations in frequency domain.

According to the method in the specific embodiment of the present disclosure, when the terminal detects corresponding PDCCHs in search spaces corresponding to a same CORESET at different times, the same CORESET occupies different locations in frequency domain; or when the terminal detects corresponding PDCCHs in a same search space at different times, a same search space occupies different locations in frequency domain; or when the terminal detects corresponding PDCCHs in at least two search spaces of a CORESET, the at least two search spaces occupy different locations in frequency domain.

As shown in FIG. 16, in the related art, it is assumed that the CORESET is on the first subband in a fixed manner. In this case, because a resource is continuously occupied and a resource between two consecutive times of resource occupation is idle for a very short time, a PDCCH may fail to be continuously sent. According to the method in the specific embodiment of the present disclosure, a CORESET and/or a search space may be mapped to any one of regions A, B, C, and D in FIG. 16, and a PDCCH is sent, thereby improving timeliness of PDCCH transmission.

In a specific embodiment of the present disclosure, the CORESET corresponding to different times occupies different locations in frequency domain, or search spaces in the CORESET corresponding to different times occupy different locations in frequency domain. When resources occupied by the CORESET span a plurality of subbands in frequency domain, a PDCCH probably cannot be transmitted on the entire CORESET because some of the resources are occupied.

FIG. 16 is still used as an example. When the resources occupied by the CORESET involve two lowest subbands, although a resource on one of the subbands may be used to transmit the PDCCH, the PDCCH cannot be transmitted because a resource on another subband is occupied for a long time.

In a specific embodiment of the present disclosure, to further reduce a possibility of occurrence of the foregoing case, a bundle size of a resource element group REG is further extended, and is set to be greater than a maximum value (6) specified in an existing protocol, for example, is set to a parameter such as 12, 18, or 24.

To ensure that the PDCCH is mapped to one subband, in a specific embodiment of the present disclosure, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

For example, it is assumed that one CORESET includes the following three search spaces: an SS0, an SS1, and an SS2, and possible aggregation levels corresponding to the three search spaces are as follows:

| CORESET | Search space | Aggregation level of candidate blind detection |
| --- | --- | --- |
| CORESET1 | SS0 | AL = 1, AL = 2, AL = 4 |
| | SS1 | AL = 1, AL = 2 |
| | SS2 | AL = 1 |

According to the method in the specific embodiment of the present disclosure, the first value is 4, and the second value is 6 according to an existing protocol specification. Therefore, the bundle size of the REG is 24. In this case, the PDCCH is mapped to a same subband, to improve a timely rate of PDCCH transmission.

A specific embodiment of the present disclosure further provides a sending method, applied to a network side device. As shown in FIG. 17, the method includes the following steps.

Step 1701: Receive a physical downlink control channel PDCCH in a search space associated with a CORESET.

The CORESET corresponding to different times occupies different locations in frequency domain; or search spaces in the CORESET corresponding to different times occupy different locations in frequency domain; or at least two search spaces in the CORESET occupy different locations in frequency domain.

In the foregoing sending method,
if the CORESET corresponding to different times occupies different locations in frequency domain, frequency domain resources occupied by the CORESET corresponding to different times are distributed in different channel monitoring subbands;
or
if the search spaces in the CORESET corresponding to different times occupy different locations in frequency domain, frequency domain resources occupied by the search spaces in the CORESET corresponding to different times are distributed in different channel monitoring subbands;
or
if the at least two search spaces in the CORESET occupy different locations in frequency domain, frequency domain resources occupied by the at least two search spaces are distributed in different channel monitoring subbands.

In the foregoing sending method, if the CORESET includes at least two search spaces, initial frequency domain offsets of the at least two search spaces are the same or different.

In the foregoing sending method, frequency domain offset amplitudes of the at least two search spaces in the CORESET corresponding to different time units are the same or different.

In the foregoing sending method, a bundle size of a resource element group REG of the CORESET is greater than 6.

In the foregoing sending method, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

A specific embodiment of the present disclosure further provides a sending method, applied to a network side device. As shown in FIG. 18, the method includes the following steps.

Step 1801: Send a physical downlink control channel PDCCH in a search space associated with a CORESET, where a bundle size of a resource element group REG of the CORESET is greater than 6.

In the foregoing sending method, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE A specific embodiment of the present disclosure further provides a receiving method. As shown in FIG. 19, the method includes the following steps.

Step 1901: Receive a physical downlink control channel PDCCH in a search space associated with a CORESET.

A bundle size of a resource element group REG of the CORESET is greater than 6.

In the foregoing receiving method, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

Referring to FIG. 20, FIG. 20 is a structural diagram of a terminal according to an embodiment of the present disclosure. As shown in FIG. 20, a terminal 2000 includes:
a receiving module 2001, configured to receive a physical downlink control channel PDCCH in a search space associated with a CORESET, where
the CORESET corresponding to different times occupies different locations in frequency domain; or search spaces in the CORESET corresponding to different times occupy different locations in frequency domain; or at least two search spaces in the CORESET occupy different locations in frequency domain.

Optionally, if the CORESET corresponding to different times occupies different locations in frequency domain, frequency domain resources occupied by the CORESET corresponding to different times are distributed in different channel monitoring subbands;
or
if the search spaces in the CORESET corresponding to different times occupy different locations in frequency domain, frequency domain resources occupied by the search spaces in the CORESET corresponding to different times are distributed in different channel monitoring subbands;
or
if the at least two search spaces in the CORESET occupy different locations in frequency domain, frequency domain resources occupied by the at least two search spaces are distributed in different channel monitoring subbands.

Optionally, if the CORESET includes at least two search spaces, initial frequency domain offsets of the at least two search spaces are the same or different.

Optionally, frequency domain offset amplitudes of the at least two search spaces in the CORESET corresponding to different time units are the same or different.

Optionally, a bundle size of a resource element group REG of the CORESET is greater than 6.

Optionally, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

The terminal 2000 can implement the processes implemented by the terminal in the foregoing method embodiment and achieve a same beneficial effect. To avoid repetition, details are not described herein again.

Figure 21:
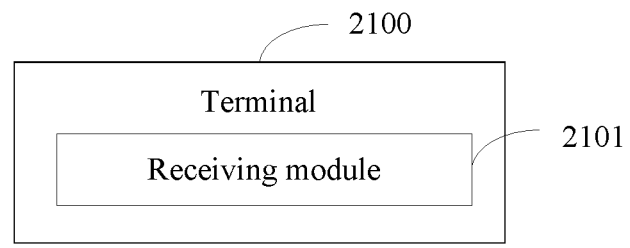
FIG. 21 is a second structural diagram of a terminal according to an embodiment of the present disclosure.

Referring to FIG. 21, FIG. 21 is a structural diagram of another terminal according to the present disclosure. As shown in FIG. 21, a terminal 2100 includes:
- a receiving module 2101, configured to receive a physical downlink control channel PDCCH in a search space associated with a CORESET, where
- a bundle size of a resource element group REG of the CORESET is greater than 6.

Optionally, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

The terminal 2100 can implement the processes implemented by the terminal in the foregoing method embodiment and achieve a same beneficial effect. To avoid repetition, details are not described herein again.

Figure 22:
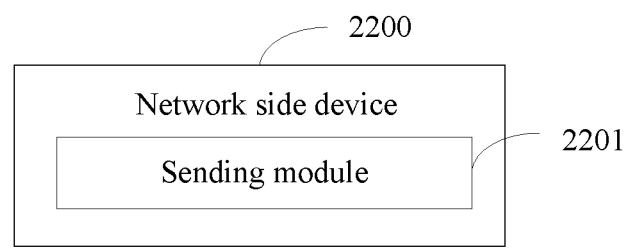
FIG. 22 is a first structural diagram of a network side device according to an embodiment of the present disclosure.

Referring to FIG. 22, FIG. 22 is a schematic structural diagram of a network side device according to an embodiment of the present disclosure. As shown in FIG. 22, a network side device 2200 includes:
- a sending module 2201, configured to send a physical downlink control channel PDCCH in a search space associated with a CORESET, where
- the CORESET corresponding to different times occupies different locations in frequency domain; or search spaces in the CORESET corresponding to different times occupy different locations in frequency domain; or at least two search spaces in the CORESET occupy different locations in frequency domain.
- Optionally, if the CORESET corresponding to different times occupies different locations in frequency domain, frequency domain resources occupied by the CORESET corresponding to different times are distributed in different channel monitoring subbands;
- or
- if the search spaces in the CORESET corresponding to different times occupy different locations in frequency domain, frequency domain resources occupied by the search spaces in the CORESET corresponding to different times are distributed in different channel monitoring subbands;
- or
- if the at least two search spaces in the CORESET occupy different locations in frequency domain, frequency domain resources occupied by the at least two search spaces are distributed in different channel monitoring subbands.

Optionally, if the CORESET includes at least two search spaces, initial frequency domain offsets of the at least two search spaces are the same or different.

Optionally, frequency domain offset amplitudes of the at least two search spaces are in the CORESET corresponding to different time units the same or different.

Optionally, a bundle size of a resource element group REG of the CORESET is greater than 6.

Optionally, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

The network side device 2200 can implement the processes implemented by the network side device in the foregoing method embodiment and achieve a same beneficial effect. To avoid repetition, details are not described herein again.

Figure 23:
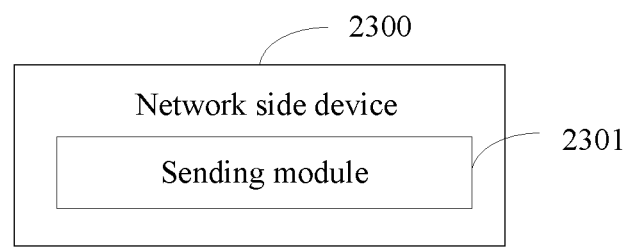
FIG. 23 is a second structural diagram of a network side device according to an embodiment of the present disclosure.

Referring to FIG. 23, FIG. 23 is a schematic structural diagram of a network side device according to another embodiment of the present disclosure. As shown in FIG. 23, a network side device 2300 includes:
- a sending module 2301, configured to send a physical downlink control channel PDCCH in a search space associated with a CORESET, where a bundle size of a resource element group REG of the CORESET is greater than 6.

Optionally, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

The network side device 2300 can implement the processes implemented by the network side device in the foregoing method embodiment and achieve a same beneficial effect. To avoid repetition, details are not described herein again.

Figure 24:
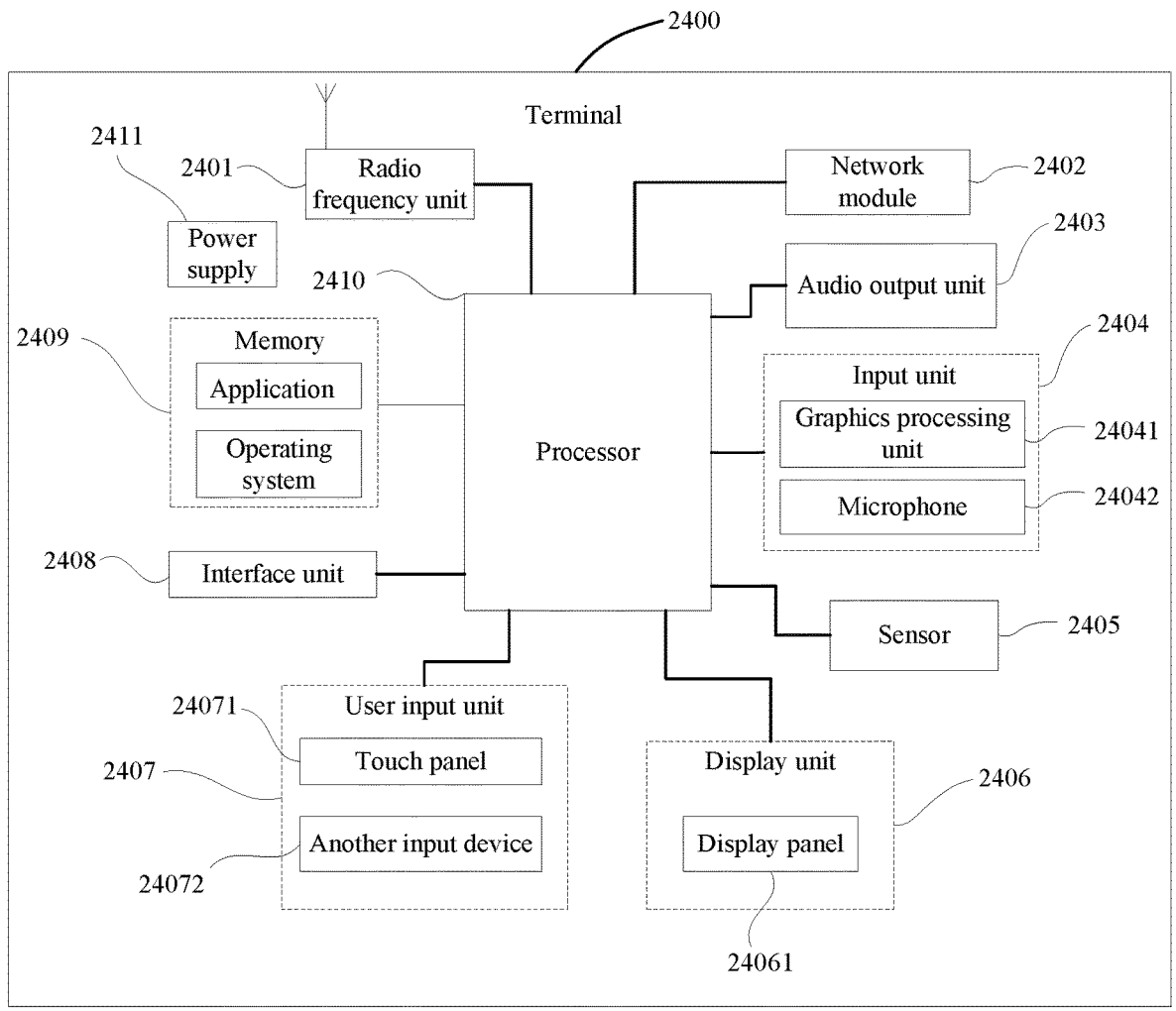
FIG. 24 is a third structural diagram of a terminal according to an embodiment of the present disclosure.

FIG. 24 is a schematic structural diagram of hardware of a terminal implementing embodiments of the present disclosure. The terminal 2400 includes but is not limited to: a radio frequency unit 2401, a network module 2402, an audio output unit 2403, an input unit 2404, a sensor 2405, a display unit 2406, a user input unit 2407, an interface unit 2408, a memory 2409, a processor 2410, a power supply 2411, and other components. It may be understood by persons skilled in the art that, the terminal structure shown in FIG. 24 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle mobile terminal, a wearable device, a pedometer, and the like.

The radio frequency unit 2410 is configured to receive a physical downlink control channel PDCCH in a search space associated with a CORESET, where the CORESET corresponding to different times occupies different locations in frequency domain; or search spaces in the CORESET corresponding to different times occupy different locations in frequency domain; or at least two search spaces in the CORESET occupy different locations in frequency domain In a specific embodiment of the present disclosure, when sending the physical downlink control channel PDCCH in the search space associated with the CORESET, the network side device performs frequency-domain offset processing on the CORESET and search spaces corresponding to different times or search spaces in the CORESET at a same time in a plurality of manners, to improve timeliness of PDCCH sending.

Optionally, if the CORESET corresponding to different times occupies different locations in frequency domain, frequency domain resources occupied by the CORESET corresponding to different times are distributed in different channel monitoring subbands; or if the search spaces in the CORESET corresponding to different times occupy different locations in frequency domain, frequency domain resources occupied by the search spaces in the CORESET corresponding to different times are distributed in different channel monitoring subbands; or if the at least two search spaces in the CORESET occupy different locations in frequency domain, frequency domain resources occupied by the at least two search spaces are distributed in different channel monitoring subbands.

Optionally, if the CORESET includes at least two search spaces, initial frequency domain offsets of the at least two search spaces are the same or different.

Optionally, frequency domain offset amplitudes of the at least two search spaces in the CORESET corresponding to different time units are the same or different.

Optionally, a bundle size of a resource element group REG of the CORESET is greater than 6.

Optionally, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

It should be understood that, in this embodiment of the present disclosure, the radio frequency unit 2401 may be configured to receive and send information or a signal in a call process. Specifically, after receiving downlink data from a base station, the radio frequency unit 2401 sends the downlink data to the processor 2410 for processing. In addition, the radio frequency unit 2401 sends uplink data to the base station Generally, the radio frequency unit 2401 includes but is not limited to an antenna, at least one amplifier, a transceiver, a coupler, a low noise amplifier, a duplexer, and the like. In addition, the radio frequency unit 2401 may communicate with a network and another device through a wireless communication system.

The terminal provides wireless broadband Internet access for the user by using the network module 2402, for example, helping the user to send and receive an e-mail, brows a web page, and access streaming media.

The audio output unit 2403 may convert audio data received by the radio frequency unit 2401 or the network module 2402 or stored in the memory 2409 into an audio signal and output the audio signal as a sound. Moreover, the audio output unit 2403 may further provide audio output (for example, call signal receiving sound and message receiving sound) related to a specific function performed by the terminal 2400. The audio output unit 2403 includes a speaker, a buzzer, a receiver, and the like.

The input unit 2404 is configured to receive an audio signal or a video signal. The input unit 2404 may include a graphics processing unit (GPU) 24041 and a microphone 24042, and the graphics processing unit 24041 processes image data of a still picture or a video obtained by an image capture apparatus (for example, a camera) in an image capture mode or a video capture mode. A processed image frame may be displayed on the display unit 2406. The image frame processed by the graphics processing unit 24041 may be stored in the memory 2409 (or another storage medium) or sent by using the radio frequency unit 2401 or the network module 2402. The microphone 24042 may receive a sound and can process such sound into audio data. The processed audio data may be converted, in a call mode, into a format that can be sent to a mobile communication base station by using the radio frequency unit 2401.

The terminal 2400 further includes at least one sensor 2405, such as a light sensor, a motion sensor, and another sensor. Specifically, the light sensor includes an ambient light sensor and a proximity sensor, where the ambient light sensor can adjust brightness of the display panel 24061 based on brightness of ambient light, and the proximity sensor can turn off the display panel 24061 and/or backlight when the terminal 2400 moves towards the ear. As a type of motion sensor, the acceleration sensor can detect a value of an acceleration in each direction (generally three axes), and detect a value and a direction of gravity when the acceleration sensor is static, and is applicable to an application for recognizing a terminal posture (for example, switching between a landscape screen and a portrait screen, relevant games, and magnetometer posture calibration), a function related to vibration recognition (such as a pedometer or a knock), and the like. The sensor 2405 may further include a fingerprint sensor, a pressure sensor, an iris sensor, a molecular sensor, a gyroscope, a barometer, a hygrometer, a thermometer, an infrared sensor, and the like. Details are not described herein.

The display unit 2406 is configured to display information entered by a user or information provided for the user. The display unit 2406 may include a display panel 24061, and the display panel 24061 may be configured in a form of liquid crystal display (Liquid Crystal Display, LCD), organic light-emitting diode (OLED), or the like.

The user input unit 2407 may be configured to receive input numeral or character information, and generate key signal input related to user setting and functional control of the terminal. Specifically, the user input unit 2407 includes a touch panel 24071 and another input device 24072. The touch panel 24071 is also referred to as a touchscreen, and may collect a touch operation performed by a user on or near the touch panel 24071 (such as an operation performed by a user on the touch panel 24071 or near the touch panel 24071 by using any proper object or accessory, such as a finger or a stylus). The touch panel 24071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 2410, and can receive and execute a command sent by the processor 2410. In addition, the touch panel 24071 can be implemented in various types such as resistive, capacitive, infrared, and surface acoustic waves. In addition to the touch panel 24071, the user input unit 2407 may further include the another input device 24072. Specifically, the another input device 24072 may include but is not limited to at least one of a physical keyboard, a functional button (such as a volume control button or a power on/off button), a trackball, a mouse, and a joystick. Details are not described herein.

Further, the touch panel 24071 may cover the display panel 24061. When detecting the touch operation on or near the touch panel 24071, the touch panel 24071 transmits the touch operation to the processor 2410 to determine a type of a touch event, and then the processor 2410 provides corresponding visual output on the display panel 24061 based on the type of the touch event. In FIG. 24, the touch panel 24071 and the display panel 24061 are used as two independent components to implement input and output functions of the terminal. However, in some embodiments, the touch panel 24071 and the display panel 24061 may be integrated to implement the input and output functions of the terminal. This is not specifically limited herein.

The interface unit 2408 is an interface connecting an external apparatus to the terminal 2400. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 2408 may be configured to receive an input (for example, data information and power) from an external apparatus and transmit the received input to one or more elements within the terminal 2400, or may be configured to transmit data between the terminal 2400 and the external apparatus.

The memory 2409 may be configured to store software programs and various data. The memory 2409 may mainly include a program storage area and a data storage area. The program storage area may store an operating system, an application required by at least one function (such as a sound playback function and an image playback function), and the like. The data storage area may store data (such as audio data and a phone book) created based on use of the mobile phone, and the like. In addition, the memory 2409 may include a high-speed random access memory, and may further include a nonvolatile memory, for example, at least one magnetic disk storage device, a flash storage device, or another volatile solid-state storage device.

The processor 2410 is a control center of the terminal, connects various parts of the entire terminal by using various interfaces and circuits, and performs various functions of the terminal and processes data by running or executing software programs and/or modules stored in the memory 2409 and invoking data stored in the memory 2409, so as to monitor the terminal as a whole. The processor 2410 may include one or more processing units. Preferably, the processor 2410 may be integrated with an application processor and a modem processor. The application processor mainly processes an operating system, a user interface, an application, and the like. The modem processor mainly processes wireless communication. It may be understood that, alternatively, the modem processor may not be integrated into the processor 2410.

The terminal 2400 may further include the power supply 2411 (such as a battery) that supplies power to each component. Preferably, the power supply 2411 may be logically connected to the processor 2410 by using a power management system, so as to implement functions such as charging, discharging, and power consumption management by using the power management system.

In addition, the terminal 2400 includes some function modules not shown. Details are not described herein.

Preferably, an embodiment of the present disclosure further provides a terminal, including a processor 2410, a memory 2409, and a computer program that is stored in the memory 2409 and that can run on the processor 2410. When executing the computer program, the processor 2410 implements the foregoing processes of the receiving method embodiment and a same technical effect can be achieved. To avoid repetition, details are not described herein again.

An embodiment of the present disclosure further provides a computer-readable storage medium. The computer-readable storage medium stores a computer program, and when executing the computer program, a processor implements the foregoing processes of the receiving method embodiment and a same technical effect can be achieved. To avoid repetition, details are not described herein again. The computer-readable storage medium is, for example, a read-only memory (ROM), a random access memory (RAM), a magnetic disk, or an optical disc.

Another embodiment of the present disclosure provides a terminal, including components such as a radio frequency unit 2401, a network module 2402, an audio output unit 2403, an input unit 2404, a sensor 2405, a display unit 2406, a user input unit 2407, an interface unit 2408, a memory 2409, a processor 2410, and a power supply 2411. The radio frequency unit 2401 is configured to:

receive a physical downlink control channel PDCCH in a search space associated with a CORESET, where
a bundle size of a resource element group REG of the CORESET is greater than 6.

In a specific embodiment of the present disclosure, in this case, PDCCHs are mapped to a same subband as much as possible, thereby improving a success rate of PDCCH transmission.

Optionally, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

Preferably, an embodiment of the present disclosure further provides a terminal, including a processor 2410, a memory 2409, and a computer program that is stored in the memory 2409 and that can run on the processor 2410. When executing the computer program, the processor 2410 implements the foregoing processes of the receiving method embodiment and a same technical effect can be achieved. To avoid repetition, details are not described herein again.

An embodiment of the present disclosure further provides a computer-readable storage medium. The computer-readable storage medium stores a computer program, and when executing the computer program, a processor implements the foregoing processes of the receiving method embodiment and a same technical effect can be achieved. To avoid repetition, details are not described herein again. The computer-readable storage medium is, for example, a read-only memory (ROM), a random access memory (RAM), a magnetic disk, or an optical disc.

Figure 25:
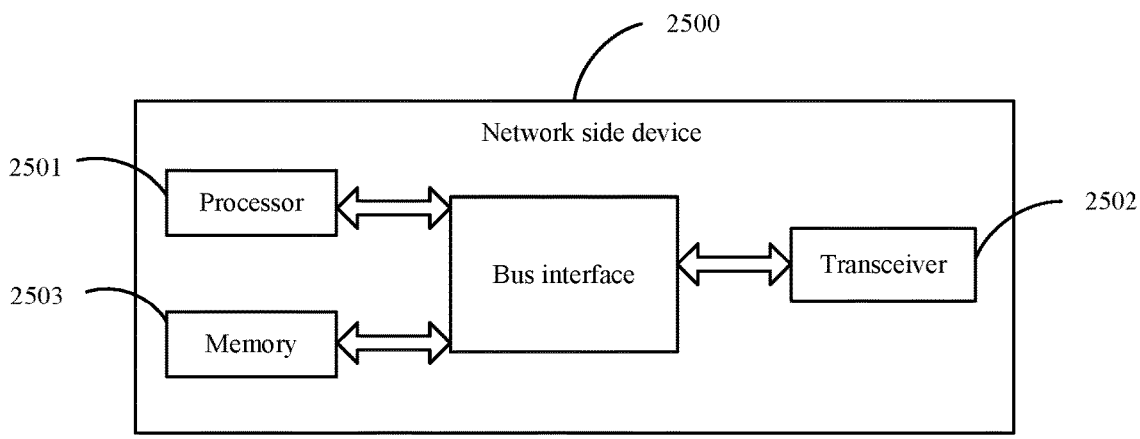
FIG. 25 is a third structural diagram of a network side device according to an embodiment of the present disclosure.

Referring to FIG. 25, FIG. 25 is a structural diagram of a network side device according to an embodiment of the present disclosure. As shown in FIG. 25, a network side device 2500 includes a processor 2501, a transceiver 2502, a memory 2503, and a bus interface.

The transceiver 2502 is configured to send a physical downlink control channel PDCCH in a search space associated with a CORESET, where
the CORESET corresponding to different times occupies different locations in frequency domain; or search spaces in the CORESET corresponding to different times occupy different locations in frequency domain; or at least two search spaces in the CORESET occupy different locations in frequency domain.

Optionally, if the CORESET corresponding to different times occupies different locations in frequency domain, frequency domain resources occupied by the CORESET corresponding to different times are distributed in different channel monitoring subbands;
or
if the search spaces in the CORESET corresponding to different times occupy different locations in frequency domain, frequency domain resources occupied by the search spaces in the CORESET corresponding to different times are distributed in different channel monitoring subbands;

or if the at least two search spaces in the CORESET occupy different locations in frequency domain, frequency domain resources occupied by the at least two search spaces are distributed in different channel monitoring subbands.

Optionally, if the CORESET includes at least two search spaces, initial frequency domain offsets of the at least two search spaces are the same or different.

Optionally, frequency domain offset amplitudes of the at least two search spaces in the CORESET corresponding to different time units are the same or different.

Optionally, a bundle size of a resource element group REG of the CORESET is greater than 6.

Optionally, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

In FIG. 25, a bus architecture may include any quantity of interconnected buses and bridges, which are specifically connected together by various circuits of one or more processors represented by the processor 2501 and a memory represented by the memory 2503. The bus architecture may further link various other circuits such as a peripheral device, a voltage regulator, and a power management circuit together. These are all well-known in the art, and therefore are not further described in this specification. The bus interface provides an interface. The transceiver 2502 may be a plurality of components. To be specific, the transceiver 2502 includes a transmitter and a receiver, and provides a unit configured to communicate with various other apparatuses on a transmission medium. For different user equipment, the user interface 2504 may alternatively be an interface for externally and internally connecting required equipment. The connected equipment includes but is not limited to a keypad, a display, a speaker, a microphone, a joystick, and the like.

The processor 2501 is responsible for bus architecture management and general processing. The memory 2503 may store data used by the processor 2501 when the processor 2501 performs an operation.

It should be noted that the network side device 2500 in this embodiment may be a network side device in any implementation in the method embodiments in the embodiments of the present disclosure. Any implementation of the network side device in the method embodiments in the embodiments of the present disclosure may be implemented by the network side device 2500 in this embodiment, and a same beneficial effect is achieved. To avoid repetition, details are not described herein again.

An embodiment of the present disclosure further provides a computer-readable storage medium. The computer-readable storage medium stores a computer program, and when executing the computer program, a processor implements the foregoing processes of the access control method embodiment corresponding to the network side device and a same technical effect can be achieved. To avoid repetition, details are not described herein again. The computer-readable storage medium includes a read-only memory ROM), a random access memory (RAM), a magnetic disk, or an optical disc.

Another embodiment of the present disclosure provides a network side device, including a processor 2501, a transceiver 2502, a memory 2503, and a bus interface.

The transceiver 2502 is configured to send a physical downlink control channel PDCCH in a search space associated with a CORESET, where a bundle size of a resource element group REG of the CORESET is greater than 6.

Optionally, the bundle size of the resource element group REG of the CORESET is equal to a product of a first value and a second value, the first value is a maximum value in all aggregation level values corresponding to all search spaces of the PDCCH, and the second value is a quantity of resource element groups REGs included in one control channel element CCE.

An embodiment of the present disclosure further provides a computer-readable storage medium. The computer-readable storage medium stores a computer program, and when executing the computer program, a processor implements the foregoing processes of the access control method embodiment corresponding to the network side device and a same technical effect can be achieved. To avoid repetition, details are not described herein again The computer-readable storage medium includes a read-only memory (ROM), a random access memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more limitations, an element defined by "including a . . . " does not preclude the existence of other identical elements in the process, method, article, or apparatus that includes the element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially, or the part contributing to the prior art may be implemented in a form of a software product. The computer software product is stored in a storage medium (for example, a ROM/RAM, a magnetic disk, or an optical disc), and includes a plurality of instructions for instructing a terminal (which may be a mobile phone, a computer, a server, an air conditioner, a network device, or the like) to perform the method described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

The invention claimed is:

1. A receiving method, applied to a terminal, wherein the receiving method comprises:

receiving a physical downlink control channel PDCCH in a search space associated with a control resource set CORESET, wherein the CORESET comprises at least two search spaces, and the at least two search spaces in the CORESET occupy different locations in frequency domain;

frequency domain resources occupied by the at least two search spaces are distributed in different channel monitoring subbands, wherein initial frequency domain offsets of the at least two search spaces are the same or different; and frequency domain offset amplitudes of the at least two search spaces in the CORESET corresponding to different time units are the same or different.

2. The receiving method according to claim 1, wherein a bundle size of a resource element group REG of the CORESET is greater than 6.

3. The receiving method according to claim 2, wherein the bundle size of the resource element group REG of the CORESET is equal to a product of a first value and a second value, the first value is a maximum value in all aggregation level values corresponding to all search spaces of the PDCCH, and the second value is a quantity of resource element groups REGs comprised in one control channel element CCE.

4. A sending method, applied to a network side device, wherein the sending method comprises:

sending a physical downlink control channel PDCCH in a search space associated with a control resource set CORESET, wherein the CORESET comprises at least two search spaces, and the at least two search spaces in the CORESET occupy different locations in frequency domain;

frequency domain resources occupied by the at least two search spaces are distributed in different channel monitoring subbands, wherein initial frequency domain offsets of the at least two search spaces are the same or different; and frequency domain offset amplitudes of the at least two search spaces in the CORESET corresponding to different time units are the same or different.

5. The sending method according to claim 4, wherein a bundle size of a resource element group REG of the CORESET is greater than 6.

6. The sending method according to claim 5, wherein the bundle size of the resource element group REG of the CORESET is equal to a product of a first value and a second value, the first value is a maximum value in all aggregation level values corresponding to all search spaces of the PDCCH, and the second value is a quantity of resource element groups REGs comprised in one control channel element CCE.

7. A terminal, comprising a memory, a processor, and a computer program that is stored in the memory and that can run on the processor, wherein when executing the computer program, the processor implements a following step:

receiving a physical downlink control channel PDCCH in a search space associated with a CORESET, wherein the CORESET comprises at least two search spaces, and the at least two search spaces in the CORESET occupy different locations in frequency domain;

frequency domain resources occupied by the at least two search spaces are distributed in different channel monitoring subbands, wherein initial frequency domain offsets of the at least two search spaces are the same or different; and frequency domain offset amplitudes of the at least two search spaces in the CORESET corresponding to different time units are the same or different.

8. The terminal according to claim 7, wherein a bundle size of a resource element group REG of the CORESET is greater than 6.

9. The terminal according to claim 8, wherein the bundle size of the resource element group REG of the CORESET is equal to a product of a first value and a second value, the first value is a maximum value in all aggregation level values corresponding to all search spaces of the PDCCH, and the second value is a quantity of resource element groups REGs comprised in one control channel element CCE.

* * * * *